United States Patent [19]

Berry

[11] Patent Number: 4,704,262

[45] Date of Patent: Nov. 3, 1987

[54] PROCESS FOR PRODUCTION OF DIALKALI METAL PHOSPHATES BY ION EXCHANGE

[75] Inventor: W. Wes Berry, Lakeland, Fla.

[73] Assignee: Advanced Separation Technologies Incorporated, St. Petersburg, Fla.

[21] Appl. No.: 818,657

[22] Filed: Jan. 14, 1986

[51] Int. Cl.$^4$ .............................................. B01D 15/02
[52] U.S. Cl. .................................... 423/310; 210/681; 423/308
[58] Field of Search ................. 423/308, 312; 210/681

[56] References Cited

U.S. PATENT DOCUMENTS

| | | | |
|---|---|---|---|
| 1,369,763 | 2/1921 | Hetherington et al. | 423/310 |
| 4,522,726 | 6/1985 | Berry et al. | 210/806 |
| 4,591,439 | 5/1986 | Grot | 210/670 |
| 4,599,225 | 7/1986 | Dickey | 210/670 |

OTHER PUBLICATIONS

Kirk-Othmer, *Encyclopedia of Chemical Technology*, Third Edition, vol. 13 (1981), John Wiley & Sons, pp. 678, 685 and 686.

*Primary Examiner*—John Doll
*Assistant Examiner*—Wayne A. Langel
*Attorney, Agent, or Firm*—Burns, Doane, Swecker & Mathis

[57] ABSTRACT

A process for the production of dialkali metal phosphates by ion exchange is disclosed. The process is carried out by first ammoniating a water-soluble phosphate source such as phosphoric acid or monocalcium phosphate. The resulting ammoniated phosphate solution is then contacted with a weak cation exchange resin in the alkali metal form to produce the dialkali metal phosphate as well as an ammonium-loaded weak cation exchange resin. The cation exchange resin is regenerated by contacting it with an alkali metal salt solution which effects an exchange of alkali metal from ammonium to produce a rgenerated weak cation exchange resin in the alkali metal form as well as a water-soluble ammonium salt corresponding to the initial alkali metal salt. The process may be carried out in conventional fixed or pulsed bed ion exchange systems although it is most advantageously carried out in an Advanced Separation Device which is a multi-chambered device which enables the process to be carried out both continuously and with a greater degree of efficiency than is possible using conventional ion exchange systems.

13 Claims, 3 Drawing Figures

PROCESS FOR PRODUCTION OF DIALKALI METAL PHOSPHATES BY ION EXCHANGE

BACKGROUND OF THE INVENTION

The present invention relates to a process for producing dialkali metal phosphates and, more particularly, to a process wherein dialkali metal phosphates may be produced by ion exchange using readily available starting materials.

Alkali metal phosphates are an extremely useful class of compounds, e.g., as fertilizers. While various methods have been proposed in the past for their production, they have not all proven to be completely satisfactory due to difficulties encountered in processing or to the high cost of the starting materials. For example, one known technique for the production of dialkali metal phosphates employs wet process phosphoric acid and an alkali salt such as sodium hydroxide as starting materials. Thus, when combined with the wet process phosphoric acid, the alkali metal salt effects neutralization and subsequent precipitation of an alkali phosphate compound. Although wet process phosphoric acid is a readily available and inexpensive starting material, the alkali salts typically required, such as sodium hydroxide, are far more expensive and thus limit the commercial practicality of the above-described process.

Since the desired product is a dialkali metal phosphate compound, it was often found advantageous to react the phosphoric acid with a divalent alkali metal compound such as potassium carbonate ($K_2CO_3$). However, like the sodium hydroxide system described above, systems employing a divalent alkali metal salt such as potassium carbonate are also undesirable from an economic point of view due to their prohibitive costs.

SUMMARY AND OBJECTS OF THE INVENTION

In view of the foregoing limitations and shortcomings of prior art processes for producing dialkali metal phosphates as well as other disadvantages not specifically mentioned above, it should be apparent that there still exists a need in the art for a process wherein dialkali metal phosphates can be produced from relatively inexpensive and readily available starting materials. It is, therefore, a primary objective of the invention to fulfill that need by providing a process wherein relatively inexpensive alkali metal salts such as KCl, $K_2SO_4$, NaCl and $Na_2SO_4$ are used as the sources of the alkali metal and not the more expensive alkali metal sources such as NaOH.

More particularly, it is an object of this invention to provide a process wherein dialkali metal phosphates are produced by ion exchange using a water soluble phosphate source, ammonia, and an economical alkali metal salt.

It is a further object of this invention to provide an ion exchange process which is carried out at maximum efficiency utilizing an Advanced Separation Device (hereinafter referred to as ASD).

Briefly described, these and other objects of the invention are accomplished by providing a process for producing dialkali metal phosphates wherein a water soluble phosphate source such as monocalcium phosphate or phosphoric acid is first reacted with ammonia to produce an ammoniated phosphate solution. It has been observed, totally unexpectedly, that by ammoniating the phosphate solution prior to the ion exchange step, dialkali metal phosphates can then be produced using ammonium as the cation for exchange with an alkali metal bound to a weak cation exchange resin. Unlike the alkali metal starting materials employed by prior art processes for producing dialkali metal phosphates, the alkali metal bound to the weak cation exchange resin according to the present invention is derived from inexpensive and readily available sources such as potassium chloride, potassium sulfate, sodium chloride and sodium sulfate. Thus, the net result of the process of the present invention is the production of dialkali metal phosphates by ion exchange from ammonia, a water soluble phosphate source and an inexpensive alkali metal salt.

The process is most advantageously carried out in the ASD, which is a multi-chambered ion exchange device which enables the process to be carried out both continuously and with a greater degree of efficiency than is possible using conventional fixed or pulsed bed systems.

BRIEF DESCRIPTION OF THE DRAWINGS

A preferred embodiment of the invention is illustrated in the accompanying drawings, in which.

DETAILED DESCRIPTION OF PREFERRED EMBODIMENTS

Figure 1:
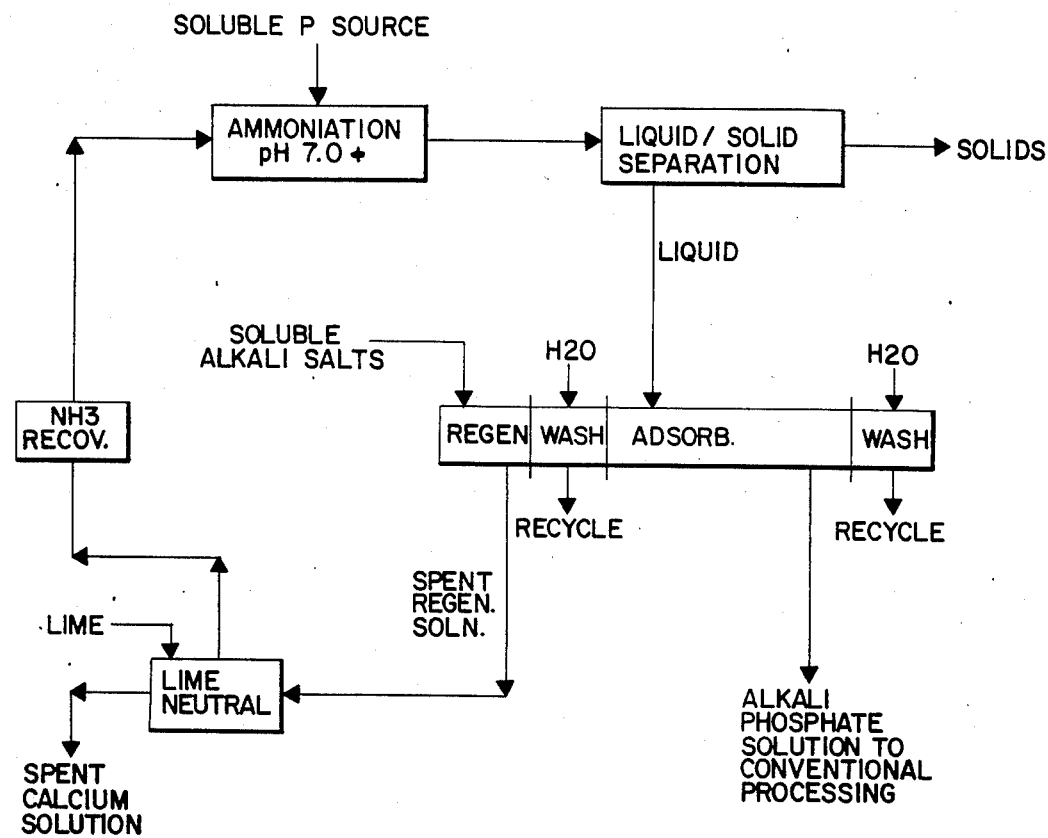
FIG. 1 is a flow diagram of the process for producing dialkali metal phosphates.

The process of the present invention is directed to the production of dialkali metal phosphates such as dipotassium phosphate of the formula $K_2HPO_4$. As illustrated in the flow diagram of FIG. 1, a water-soluble phosphate source is first ammoniated to an extent such that the pH of the feed is greater than 7.0. Since the ammonia-treated solution may contain precipitated solids, the solution is treated by well known liquid/solid separation techniques such as filtration, clarification, or combinations thereof.

The clarified ammoniated phosphate feed solution is then transferred to conventional ion exchange systems such as fixed or pulsed beds or to the ASD, which will be described hereinafter. Regardless of the ion exchange system employed, the feed solution is contacted with a weak cation exchange resin which is in the alkali metal form. An exchange of ammonium for the alkali metal then occurs whereby the dialkali metal phosphate and an ammonium-loaded weak cation exchange resin are produced. The dialkali metal phosphate solution is then sent on for further processing.

The resin which is now loaded with ammonium is first washed with a small amount of water and then regenerated with a water-soluble alkali metal salt which exchanges the alkali metal for the ammonium bound to the resin to form an alkali metal-loaded resin and an ammonium salt corresponding to the alkali metal salt, i.e., the salt of ammonium and the anion originally bound to the alkali metal. After washing with additional water, the alkali-metal loaded resin is then recycled for reaction with additional ammoniated phosphate feed solution.

The spent regeneration solution, now comprising a water-soluble ammonium salt, is then reacted with lime which causes an increase in the pH and the release of ammonia. That ammonia may then be recycled to the initial step wherein the water-soluble phosphate is ammoniated. The calcium added as lime to liberate the ammonia, which is now in the form of a calcium salt corresponding to the ammonium salt, i.e., the salt of calcium and the anion previously bound to the ammonium, is a relatively innocuous and non-volatile composition which may be disposed of quite economically and without adverse environmental impact.

As previously indicated, the material fed into the ion exchange chamber for contact with the resin comprises an ammoniated phosphate solution prepared by reacting ammonia with a water-soluble phosphate source. Generally, any water soluble phosphate source may be used, the most significant constraint being the availability and price of a particular source. It has been found for purposes of the present invention that soluble monocalcium phosphate or phosphoric acid, such as that typically known as "wet process phosphoric acid" having a phosphate concentration of 5 to 54% $P_2O_5$ by weight and preferably 10 to 30% $P_2O_5$ by weight are particularly suitable for carrying out the present invention. The monocalcium phosphate solution can be prepared by mixing an excess of normal superphosphate with water. The liquid phase is then decanted and transferred to the ammoniation stage.

The ammoniated phosphate solution is prepared by reacting gaseous ammonia with the phosphate starting material. Enough ammonia gas is reacted with the phosphate solution to result in an ammoniated phosphate solution having a pH of 7 or greater. Generally, this translates into a requirement of 1.8 to 2.2 moles of ammonia (expressed as N) per mole of the soluble phosphate source (expressed as P).

The final solution should have a nitrogen/phosphorous ratio of 1.5 to 2.5. For producing dialkali metal phosphates, the ideal ratio is 2.0 to 2.2. Lower ratios result in lower alkali contents in the final solution.

Once the solution has been ammoniated, it is treated in a conventional liquid/solid separation scheme whereby precipitated solids are removed. Such devices are well known in the art and thus are not described any further herein. The clarified ammoniated phosphate solution is then sent to the ion exchange chambers for contact with the weak cation exchange resin which is in the alkali metal form.

A weak cation exchange resin found particularly suitable for the process of the present invention is the C464 material marketed by Rohm and Haas Co., Philadelphia, Pa. The particular weak cation exchange resin employed is not critical. Exemplary resins include styrene polymers containing phenolic, phosphorous or carboxylic functional groups.

The regeneration fluid is a water-soluble alkali metal salt. It should be chosen such that it will remain soluble when the alkali metal ion is replaced by the ammonium ion to form the corresponding ammonium salt. Suitable alkali metal salts include potassium chloride, potassium sulfate, sodium chloride and sodium sulfate, all of which form water-soluble salts with ammonium upon ion exchange e.g. ammonium chloride and ammonium sulfate.

The concentration of the aqueous alkali metal salt regeneration solution should range from 10 to 90% by weight and preferably 75 to 90% by weight of the ambient temperature saturation level. The upper limit will to some extent be determined by the corresponding saturation level of the resulting dialkali phosphate solution.

As previously indicated, the ammoniated phosphate solution as well as the alkali metal salt regeneration fluid may be contacted with the weak cation exchange resin in conventional exchange equipment such as in fixed or pulsed beds. A particularly preferred embodiment of the present invention, however, is to carry out the ion exchange reaction in the ASD. The ASD is fully described in U.S. Pat. No. 4,522,726 and in application Ser. No. 713,492, filed Mar. 19, 1985, both of which are hereby incorporated by reference.

Figure 2:
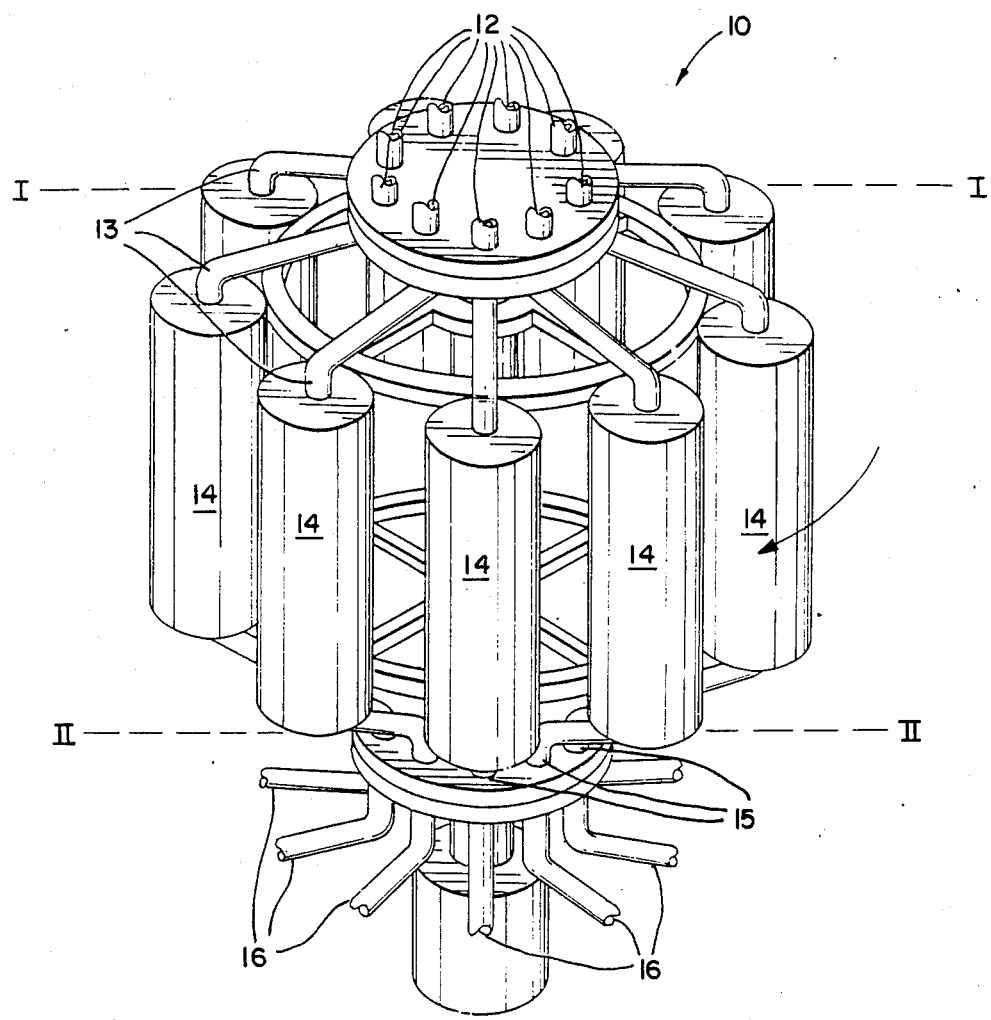
FIG. 2 is a perspective view of the Advanced Separation Device.

The ASD is illustrated in FIG. 2. It comprises a plurality of fixed feed ports 12, to each of which may be supplied the various feed materials. In the case of the present invention, these materials include the ammoniated phosphate feed solution, the alkali metal regeneration fluid and optionally, one or more wash water feed streams.

Moving about a circular path in periodic fluid communication with each of the above-described fixed feed ports are a plurality of chambers 14 filled with the weak cation exchange resin which interacts with the feed fluids. The effluent i.e., the fluid which results from the interaction of the feed materials with the exchange material will hereinafter be referred to as the interaction product. In the process of the present invention, the weak cation exchange resin is advantageously the C464 resin manufactured by Rohm and Haas, or the equivalent.

It will be appreciated that the feed materials are supplied continuously to the respective feed ports 12 for periodic interaction with the resin in each of the chambers 14. In similar fashion, a plurality of fixed discharge ports 16 are provided at an end of the chambers opposite to that of the fixed feed ports 12. Each feed port 12 has a corresponding discharge port 16. Additionally, conduits 13 connect the rotating chambers 14 to the fixed feed ports 12 whereas conduits 15 connect the rotating chambers 14 to the fixed discharge ports 16. After the interaction product passes through a given fixed discharge port, it may be purged from the system, recirculated back to a selected feed port, or a combination of both. The rate of rotation of the chambers is highly dependent on their number and on the flow rates of materials. However, such can be empirically determined by those skilled in the art.

EXAMPLE

Figure 3:
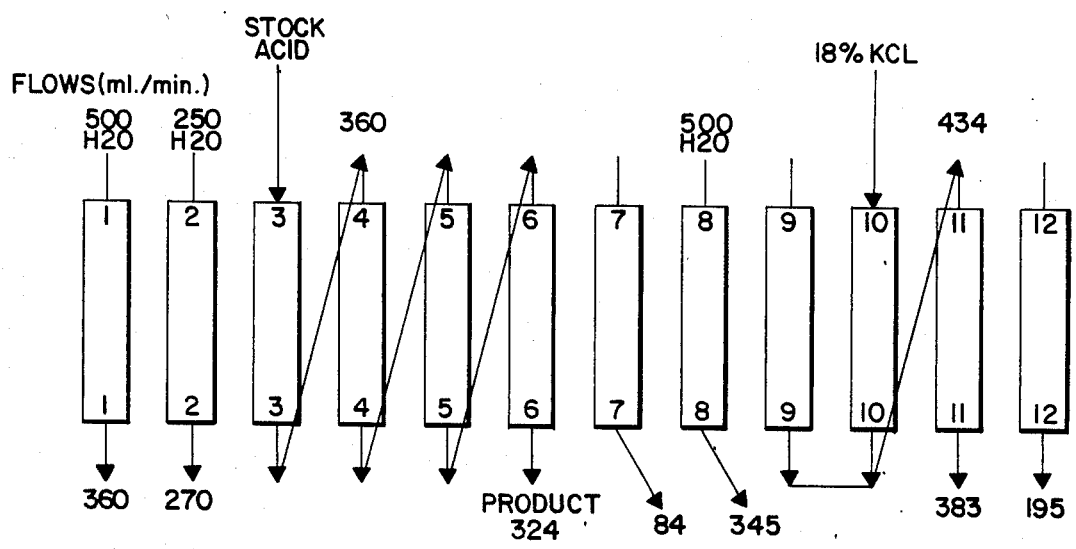
FIG. 3 is a schematic illustration of the process carried out in the Advanced Separation Device.

The process, carried out in conjunction with the ASD, is schematically illustrated in FIG. 3. The ASD was constructed with twelve fixed feed ports (1F–12F) and twelve fixed discharge ports (1D–12D). Interposed between the fixed feed and discharge ports were 14 rotating chambers 1.5 inches in diameter and filled with 1.3 liters of the C464 weak cation exchange resin marketed by Rohm and Haas. The chambers were rotated at the rate of 15 to 20 minutes per rotation.

A solution of monocalcium phosphate, which is a readily available raw material, was ammoniated to a pH of 9.0 by passing a stream of ammonia gas therethrough. The monocalcium phosphate was prepared by mixing an excess of normal superphosphate with water. The liquid phase was decanted and transferred to the ammoniation stage. The resulting solution contained 5.90% by weight ammonia and 9.05% by weight $P_2O_5$, which corresponds to a nitrogen/phosphorous molar ratio of about 2.2. The solution was fed into fixed feed port 3F at the rate of 360 ml/min for delivery to the weak cation exchange resin, which was loaded with potassium. The interaction product, comprising dipotassium phosphate ($K_2HPO_4$) as well as depleted levels of ammoniated phosphate solution, was discharged through fixed discharge port 3D and was circulated countercurrently i.e., against the direction of chamber rotation, to the next three consecutive fixed feed ports 4F, 5F and 6F. Thus, the interaction product discharged through fixed discharge port 4D, containing additional dipotassium phosphate as well as still further depleted levels of ammoniated phosphate solution, was delivered to fixed feed port 5F to produce a third interaction product which was discharged through fixed port 5D for delivery to fixed port 6F. The fourth interaction product was discharged from the ASD at a rate of 324 ml/min via fixed discharge port 6D and was then collected. The product comprised by weight 0.10% $NH_3$, 5.56% $P_2O_5$ and 4.17% $K_2O$. As would be expected due to the depletion of ammonia from the feed solution, the product had a pH of 7.0.

As was previously indicated, it is advantageous to wash the ammonium-loaded resin prior to regenerating it. To this end, wash water was fed into fixed feed ports 1F and 2F at rates of 500 and 250 ml/min respectively. It was then discharged through discharge ports 2D, 1D and 12D at the rates of 270, 360 and 195 ml/min respectively. As would be expected, a greater volume of liquid is discharged from the ASD than is fed therein during the washing stage due to the release of liquid which was entrained during the ion exchange stage.

The ammonium-loaded resin was regenerated with an 18% solution of aqueous potassium chloride, which was fed into fixed feed port 10F at the rate of 434 ml/min. As is shown in FIG. 3, one portion of the regeneration interaction product, comprising ammonium chloride and depleted levels of potassium chloride, was discharged through fixed discharge port 10D whereas another portion was discharged through fixed discharge port 9D, although no regeneration fluid was fed into feed port 9F. The portions from ports 9D and 10D were combined and sent to fixed feed port 11F where a second regeneration interaction product, comprising additional ammonium chloride and further depleted levels of potassium chloride, was formed and discharged at the rate of 383 ml/min through fixed port 11D as a spent regeneration fluid. The spent regeneration fluid comprised 2.33% by weight ammonia, 2.55% $K_2O$ and 5.96% Cl.

As was the case after the product formation stage, the resin in the chambers was again washed after the completion of the regeneration stage. More specifically, 500 ml/min of wash water was fed into fixed feed port 8F, 345 ml/min of which was discharged through port 8D and 84 ml/min of which was discharged through port 7D.

A summation of the results of carrying out the inventive process appears in the Table below:

TABLE

| Steam % by wt. | $NH_3$ | $P_2O_5$ | $K_2O$ | Cl | pH | $K_2O/P_2O_5$ Wt. Ratio |
|---|---|---|---|---|---|---|
| 1. Feed Solution | 5.90 | 9.09 | Trace | — | 8.9 | — |
| 2. Product Soln. | 0.10 | 5.56 | 4.17 | — | 7.0 | 1.33 |
| 3. Regen. Feed (18% KCl) | — | — | 8.97 | — | — | — |
| 4. Spent Regen. | 2.33 | — | 2.55 | 5.96 | — | — |

As was previously indicated, the ion exchange process of the present invention may be practiced in conjunction with more conventional ion exchange systems such as fixed or pulsed beds. The ASD, however, offers the unique advantage in that each of the stages of the invention namely, the product formation, washing and regeneration stages may be carried out both continuously and simultaneously. Additionally, a countercurrent flow of the treating fluid i.e., against the direction of chamber rotation, can be maintained within each individual stage. Such is a highly desirable feature of the ASD since it has been observed that a countercurrent flow of materials as described results in a more complete ion exchange reaction. It is very difficult, if not impossible, to achieve a multi-stage continuous ion-exchange process with countercurrent flow of treating fluids within each individual stage using conventional ion exchange equipment.

Further optimization of the ASD process is possible by recycling wash solutions or providing additional washing, regeneration or loading stages. Such optimization techniques, like the above-described counter-current flow, can not be practiced with conventional ion exchange equipment due to the complexity of the system.

By virtue of the process of the present invention, it is possible to obtain greater than 75% yield of dialkali phosphate based on the initial phosphate feed. Higher yields, e.g., 80 to 90% are possible when the inventive process is carried out in the ASD as opposed to conventional fixed or pulsed beds.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for producing dialkali metal phosphates comprising:
   (A) ammoniating a phosphate solution;
   (B) providing an Advanced Separation Device having:
      (i) at least one ammoniated phosphate solution feed port as well as at least one corresponding ammoniated phosphate solution discharge port; and
      (ii) a plurality of chambers filled with a weak cation exchange resin, said chambers being disposed between and moving about a circular path in periodic fluid communication with said feed and discharge ports; and
   (C) supplying said ammoniated phosphate solution to said at least one ammoniated phosphate solution feed port for delivery into said chambers containing said weak cation exchange resin which is in the alkali metal form, the ammonium being exchanged with the alkali metal to produce an ammonium-loaded weak cation exchange resin and an interaction product containing said dialkali metal phosphate and depleted levels of said ammoniated phosphate feed solution.

2. The process of claim 1 wherein said ammoniated phosphate solution is prepared by reacting ammonia with a water-soluble phosphorus source.

3. The process of claim 2 wherein said water-soluble phosphorus source is monocalcium phosphate, phosphoric acid or a combination thereof.

4. The process of claim 2 wherein 1.8 to 2.2 moles of ammonia (as nitrogen) to 1 mole of water-soluble phosphorus source (as P) are combined to form the ammoniated phosphate solution.

5. The process of claim 1 wherein said ammoniated phosphate solution has a pH of at least 7.

6. The process of claim 1 further including the step of treating said ammonium-loaded resin with a regeneration fluid containing an alkali metal salt which exchanges said alkali metal for said ammonium to form a regenerated exchange resin in the alkali metal form and a spent regeneration fluid containing an ammonium salt corresponding to said alkali metal salt.

7. The process of claim 6 further including the step of treating said spent regeneration fluid containing the ammonium salt with lime to form ammonia and a calcium salt corresponding to said ammonium salt.

8. The process of claim 7 further including the steps of removing the ammonia from the lime treated solution and recycling it to the ammoniating step.

9. The process of claim 6 wherein said alkali metal salt is potassium sulfate, potassium chloride, sodium sulfate, sodium chloride or sodium carbonate.

10. The process of claim 9 wherein said alkali metal salt is potassium chloride.

11. The process of claim 6 wherein said Advanced Separation Device includes at least one regeneration fluid feed port and at least one corresponding regeneration fluid discharge port, the process further including supplying said regeneration fluid containing an alkali metal salt to said at least one regeneration fluid feed port for delivery into said chambers containing said ammonium-loaded weak cation exchange resin to produce a regenerated exchange resin in the alkali metal form and a spent regeneration fluid containing an ammonium salt corresponding to said alkali metal salt.

12. The process of claim 11 further including the steps of:
feeding said interaction product, containing said dialkali metal phosphate and depleted levels of said ammoniated phosphate feed solution, into a second ammoniated phosphate feed solution feed port for delivery into said chambers containing the weak cation exchange resin which is in the alkali metal form to produce a second interaction product containing enhanced levels of dialkali metal phosphates and further depleted levels of ammoniated phosphate solution; and
recovering said second interaction product or delivering said second interaction product to additional fixed ammoniated phosphate solution feed ports.

13. The process of claim 11 wherein said ASD also has at least one wash water feed port as well as at least one corresponding wash water discharge port in periodic fluid communication with said chambers, a wash water feed being supplied to said at least one wash water feed port for delivery into said resin filled chambers containing said regenerated exchange resin in the alkali metal form or said ammonium-loaded resin.

* * * * *